United States Patent [19]

Bermudez et al.

[11] Patent Number: 4,487,864
[45] Date of Patent: Dec. 11, 1984

[54] MODIFIED CARBOHYDRATE POLYMERS

[75] Inventors: Mauricio Bermudez, Miami, Fla.;
Alberto L. Torres, Bogata, Colombia

[73] Assignee: The Dow Chemical Company, Midland, Mich.

[21] Appl. No.: 489,429

[22] Filed: Apr. 28, 1983

[51] Int. Cl.³ .............. C08L 1/00; C08L 1/26; C08L 3/00
[52] U.S. Cl. .............................. 524/2; 524/5; 524/6; 524/8; 524/32; 524/42; 524/55
[58] Field of Search .............. 524/2, 5, 6, 8, 42, 524/32, 55; 106/90, 315

[56] References Cited

U.S. PATENT DOCUMENTS

| | | | |
|---|---|---|---|
| 2,868,753 | 1/1959 | Morgan et al. | 524/5 |
| 3,937,633 | 2/1976 | Knight et al. | 524/5 |
| 4,015,991 | 4/1977 | Persinski et al. | 524/5 |
| 4,021,257 | 5/1977 | Bernett | 106/90 |
| 4,043,827 | 8/1977 | Bernett | 524/5 |
| 4,069,082 | 1/1978 | Grosse | 106/188 |
| 4,244,826 | 1/1981 | Swanson | 524/42 |
| 4,330,441 | 5/1982 | Böhmer | 525/54.21 |
| 4,357,166 | 11/1982 | Babcock | 106/90 |
| 4,373,959 | 2/1983 | Socha | 106/194 |

Primary Examiner—Theodore Morris

[57] ABSTRACT

Water-soluble carbohydrate polymers are modified with crosslinked water-swellable organic polymers. The modified carbohydrate polymer compositions are useful as improved water retention aids for tile adhesive compositions, and as additives in spray plasters, wall finishing compounds, tape joint cements, wall paper adhesives, and the like.

13 Claims, No Drawings

MODIFIED CARBOHYDRATE POLYMERS

BACKGROUND OF THE INVENTION

This invention relates to modified carbohydrate polymer compositions and cementitious compositions, adhesives and the like containing said modified carbohydrate polymer compositions.

Many adhesives and cementitious compositions such as construction mortars, concretes, and plasters are commonly formulated with a water retention aid to improve the characteristics thereof. For example, ceramic tile adhesives commonly employ a water retention aid in order to prevent absorption of water out of the adhesive mortar into the ceramic tile or substrate to which the tile is to be applied. By employing a water retention aid in the ceramic tile adhesive, the so-called thin-bed ceramic adhesives are possible. Similarly, plasters, crack filling compounds, ceramic extrusions and the like all generally employ a water retention aid in order to prevent the loss of water from the respective mortars and to improve the rheological properties thereof.

Various carbohydrate polymers such as cellulose ethers and starches are commonly employed as water retention aids in the aforementioned applications. Although these carbohydrate polymers work well as water retention aids, they often do not provide the desired rheological properties to the compositions. Recently, it has been found that the rheological properties of the compositions containing carbohydrate polymers are improved with the use of certain additives such as clays, asbestos and long chain organic polymers. While these additives improve the rheological properties of the compositions, their use has several disadvantages. For example, ceramic tile adhesives containing clays and long chain organic polymers often exhibit reduced bonding strength and workability. In addition, such additives are very sensitive to changes in the components of such compositions due to the ionic interaction of these additives with the other components in the composition. In addition, compositions containing such additives are often lumpy and heterogeneous. The use of asbestos, while free from many of these disadvantages, presents a significant health hazard and the use thereof is generally avoided if possible.

Accordingly, a water retention aid for use in cementitious compositions, adhesives and the like, which exhibits good rheological properties and does not significantly impair the other desirable property of compositions containing the water retention aid would be highly desired.

SUMMARY OF THE INVENTION

This invention is a modified carbohydrate polymer composition comprising (a) from about 50 to about 99.95 weight percent of a water-soluble carbohydrate polymer and (b) from about 0.05 to about 50 weight percent of a crosslinked water-swellable, nonflocculating organic polymer. The modified carbohydrate polymer compositions of this invention can be used as water retention aids in various cementitious compositions such as cement mortars, plasters, and crack fillers as well as in adhesives and the like. Such compositions containing the modified carbohydrate polymers of this invention have improved rheological properties as compared to compositions containing conventional water retention aids, and generally do not exhibit deficiencies associated with conventional water retention aids.

In another aspect, this invention is a cementitious composition or adhesive composition containing modified carbohydrate polymer composition of this invention. In particular, this invention is a ceramic tile adhesive, wall paper adhesive, gypsum or cement plaster, stucco composition or concrete containing the modified carbohydrate polymers of this invention. In an especially preferred embodiment, this invention is a dry powdered composition which on admixture with water forms a dry set ceramic tile adhesive. The dry powder composition of this invention comprises (a) from about 25 to 99.9 weight percent of Portland cement, (b) from about 0 to 74.99 weight percent of an inert filler, and (c) about 0.01 to about 10 weight percent of the modified carbohydrate polymer composition of this invention. The dry powder composition of this invention, when mixed with water, forms a dry set mortar exhibiting good sag resistance, bond strength and workability. Accordingly, the mortars prepared by mixing water with the dry powder compositions of this invention are useful as dry set mortars, especially on walls, as well as grouting compositions and the like.

In yet another aspect, this invention is a wet cement, plaster or adhesive composition containing the modified carbohydrate polymer composition of this invention.

DETAILED DESCRIPTION OF THE INVENTION

The modified carbohydrate polymer compositions of this invention comprise from about 50 to 99.95 weight percent of a water-soluble carbohydrate polymer and from about 0.05 to about 50 weight percent of a water-swellable, crosslinked nonflocculating organic polymer. Suitable carbohydrate polymers include, for example, gum tracagarth, guar gum, modified guar gum, xanthan gum, starches such as tapioca starch, modified starches and cellulose ethers. Cellulose ethers are often preferably employed in cementitious and adhesive compositions. Suitable cellulose ethers include methylcellulose, hydroxyethylcellulose, hydroxypropylcellulose, hydroxypropylmethylcellulose, ethylhydroxyethylcellulose, hydroxybutylmethylcellulose, carboxymethylcellulose, carboxymethylmethylcellulose, hydroxyethylhydroxypropylmethylcellulose, hydroxyethylmethylcellulose, hydroxyethylhydroxypropylcellulose and the like. Of these, methylcellulose and hydroxypropylmethylcellulose are preferred on the basis of performance and availability. While the molecular weight of the carbohydrate polymer is not especially critical, it has been found that when cellulose ethers are employed, performance thereof is optimized when the cellulose ether exhibits a viscosity of about 1,000 to 100,000, preferably 4,000 to 75,000 centipoises as a 2 weight percent solution in water at 20° C.

The crosslinked organic polymers suitably employed herein are those which are water-swellable and are nonflocculants. By "water-swellable" is meant that the polymer absorbs and retains water but does not dissolve therein. Advantageously, the polymer absorbs at least 50 g, preferably at least 200 g of water per gram of polymer. "Nonflocculant" or "nonflocculating" as those terms are used herein, mean a material which does not substantially induce the agglomeration of particles which are of the type present in the cementitious compositions, adhesives or like compositions in which the modified carbohydrate polymers of this invention are typically employed. One useful method for determining the flocculation activity (Flocculation Index) of organic polymers is the test described in U.S. Pat. No. 4,021,251 which is incorporated herein by reference in its entirety. Water-swellable organic polymers having a Flocculation Index, as measured by sais test, of greater than 0.50, preferably at least 0.60, more preferably at least 0.70 may be considered to be nonflocculants for the purpose of this invention.

Exemplary organic polymers usefully employed herein include crosslinked cellulose ethers, such as alkyl, hydroxylalkyl or alkyl hydroxyalkyl cellulose ethers which are crosslinked with a crosslinking agent such as 1,2-dichloroethane; sulfonated monovinylidene polymers which are crosslinked with a polyvinylidene crosslinking agent, such as sulfonated styrene/divinylbenzene copolymers; and partially hydrolyzed crosslinked polyacrylamide polymers. Preferred are polymers of acrylamide which are from about 20–50 percent hydrolyzed (i.e., 20–50 mole percent of the amide groups in the polymer are hydrolyzed to acid groups) and crosslinked with about 0.01 to about 2 weight percent, based on the weight of the polymer, of a difunctional crosslinking agent such as methylene bis acrylamide or ethylene glycol dimethacrylate.

The crosslinked organic polymer is employed in an amount sufficient to impart the desired rheological properties to the cementitious compositions, adhesives and the like prepared therewith. The optimum level of crosslinked polymer will vary somewhat according to the end use of the modified carbohydrate polymer composition. Generally, however, the crosslinked polymer comprises from about 0.05 to 50 percent of the weight of the modified carbohydrate polymer composition. Generally, when ceramic tile adhesive mortars and plasters are prepared, excellent sag resistance is imparted to the composition when the crosslinked polymer is present in an amount in the range of 0.3 to about 10, preferably about 0.3 to about 2, weight percent of the modified carbohydrate polymer composition.

Advantageously, the crosslinked organic polymer is preblended as a dry powdery mixture with the carbohydrate polymer in the aforementioned proportions. This modified carbohydrate polymer composition may then be blended with the other ingredients as required to form the desired cementitious or adhesive composition. However, the modified carbohydrate polymer compositions of this invention may be formed in situ by adding the carbohydrate polymers and the crosslinked polymer individually to the other ingredients. Preferably, all the components of the cementitious compositions or adhesive are dry blended prior to addition of water thereto.

As used herein the term "cementitious composition" refers to a composition containing a hydraulic cement. "Cement" is used herein in its broad sense to mean a material which, on admixture with water, reacts to form a hard hydrate. Commonly employed cements include alumina cement, Portland cement and gypsum. Exemplary cementitious compositions in which the modified carbohydrate polymers of this invention are usefully employed include mortars, concretes, colloidal concretes, crack fillers, caulks, wall finishing compounds, ceramic tile adhesives, manual and spray plasters, cement plasters, ceramic extrusions and the like. In addition, the modified carbohydrate polymer compositions of this invention are usefully employed in adhesives such as wall paper adhesives and tape joint compounds. The modified carbohydrate polymer compound is employed in such applications in roughly the same proportions as conventional water retention aids. While the optimum levels may vary somewhat according to the particular use, in general the modified carbohydrate polymer compositions comprise about 0.05 to about 10, preferably from about 0.2 to about 5, more preferably from 0.3 to 2, percent of the total weight of the cementitious composition. When used in an application, such as wallpaper adhesives, wherein the modified carbohydrate polymer itself is the adhesive, said modified carbohydrate polymer composition may be the sole component of the composition in which it is employed. Within these wide ranges, the skilled artisan can readily determine the optimum proportions for his particular end use.

Of particular interest are ceramic tile adhesives containing the modified carbohydrate polymers of this invention. Such ceramic tile adhesives advantageously compose from about 25 to 99.99 weight percent Portland cement, 0–74.99 weight percent of an inert filler and 0.01 to about 10 weight percent of the modified carbohydrate polymer composition of this invention. The cement employed is generally any of the commonly available cements known as Portland cements. While said Portland cements may comprise up to about 99.99 weight percent of the dry ceramic tile adhesive compositions of this invention, significant amounts of inert fillers are preferably employed herein and the Portland cement will comprise no more than about 70 percent of the dry powder composition. It is known, however, that the amount of cement and filler may be adjusted freely within the aforementioned ranges in order to tailor the properties of the mortar to the specific application.

The inert filler is generally employed to add bulk to the mortar. The fillers most generally employed in tile mortars include sand, limestone, silica, rock, stone or other inert inorganic materials. Any of the commonly employed fillers may be used herein. Optimal amounts and type of filler employed herein depend on the particular application and are readily determined by one skilled in the art.

The modified carbohydrate polymer composition is employed in amounts sufficient to prevent significant loss of water from the wet mortar due to evaporation, absorption by the ceramic tiles and other mechanisms by which water is lost. Typically, adequate water retention is seen when the modified carbohydrate polymer composition comprises at least about 0.05 weight percent of the ceramic tile adhesive. On the other hand, excess amounts of the modified carbohydrate polymer composition do not significantly improve the water retention properties of the mortar and may actually impair the properties of the mortar. Accordingly, the modified carbohydrate polymer composition will generally comprise no more than about 10 weight percent of the dry cementitious composition. Preferably the carbohydrate polymer is present in an amount from about 0.3 to about 2 weight percent of the dry cementitious composition.

Ceramic tile adhesive mortars are prepared from the dry composition of this invention by adding water thereto. Sufficient water is added to allow the cement to hydrate and to make a wet mortar slurry of workable consistency. It is recognized, of course, that the optimum amounts of water will depend somewhat on the particular use for which the mortar is to be employed.

Also of particular interest are spray plaster compositions containing these modified carbohydrate polymer compositions. An exemplary spray plaster composition comprises from about 2 to 30 weight percent gypsum, 10 to 40 weight percent calcium carbonate, 30 to 88 percent sand or other filler, and from about 0.001 to about 5 weight percent of the modified carbohydrate polymer compositions of this invention. In addition, said spray plaster compositions may contain minor amounts of a set retardant agent, such as citric acid, and a surfactant, such as a sulfonated dodecylated phenyl ether.

Also of interest are cement plaster or stucco compositions. Exemplary such cement plasters generally comprise from about 10–50 percent Portland cement, 50–90 percent sand or other filler, 0.001–0.01 percent of a surfactant and 0.01 to about 5 weight percent of modified carbohydrate polymer composition of this invention.

The following examples are intended to illustrate the invention and not to limit the scope thereof. All parts and percentages are by weight unless otherwise indicated.

In the examples, the following test procedures are employed to evaluate the samples.

Consistency is measured by dropping a weighted cylinder into the wet composition. A portion of the sample to be evaluated is blended for 5 minutes with sufficient water to form a mortar. The mortar is allowed to set for 10 minutes and then placed into a cylindrical cup having an inside diameter of 74 mm and a height of 70 mm. A cylindrical weight weighing 90.5 g and having a diameter of 24 mm, a height of 66 mm and a rounded nose is dropped nose first into the filled cup from a height of 100 mm. The penetration of the weighted cylinder into the wet mortar is measured as the consistency thereof. In all samples, the consistency is adjusted with additional water or additional dry sample until the penetrometer reading is 35 to 42 mm.

The following procedure is employed to measure water loss. Five filter paper sheets are weighed and stacked. A sixth filter paper sheet is placed on top of the five weighed sheets. Onto the sixth filter paper sheet is placed a conical vicat ring having a height of 70 mm, an upper opening of 60 mm and a bottom opening of 90 mm. The ring is filled with the sample wet mortar. The mortar is allowed to set three minutes and then the mortar, vicat ring and top sheet of filter paper are removed. The five weighed filter paper sheets are then reweighed to determine the amount of water lost by the mortar. To be suitable as a tile adhesive, water loss should be less than about 0.25 g.

Bonding strength is measured by applying a portion of the sample wet mortar onto a horizontal concrete surface using a trowel having 4×4 mm square notches. To the mortar are immediately applied four 5×5 cm tiles. A 1-kg weight is applied to each tile for thirty seconds in order to insure uniform bonding. Four additional ceramic tiles are bonded to the concrete surface in like manner ten minutes after the mortar is placed onto the concrete. Four additional tiles are added after twenty minutes and four more tiles are added thirty minutes after the mortar is applied to the concrete surface.

After seven days, one of the tiles which was applied immediately after the application of the adhesive is pulled off, as well as one each of the tiles applied 10 minutes, 20 minutes, and 30 minutes after the application of the mortar. The force required to pull off the tiles is measured and the bonding strength expressed as the force in kilograms per square centimeter required to move the tile. After 14 days, the second tile from each set is pulled off and the force required to remove the tile measured. Likewise, a third set of tiles is pulled off at 21 days and the fourth set removed at 28 days, each time measuring the required force.

Sag resistance is measured by applying the sample mortar (adjusted to a consistency of 35 to 42 mm using the penetrometer) onto a glass sheet using a 4×4 mm notched trowel. A 15×15 cm ceramic tile is placed onto the mortar. A 2-kg weight is placed onto the tile for 30 seconds to ensure uniform bonding. The glass sheet is then moved into a vertical position for a period of 30 minutes. The distance which the tile moves down the vertical glass sheet is measured as the sag resistance of the mortar. To be suitable as a ceramic tile adhesive, the sag resistance of the samples should be less than about 20 mm.

Open time (i.e., the amount of time which the spread mortar may be exposed to air before its ability to adhere to the tiles is lost) is measured as follows: the mortar is prepared to a consistency of 35 to 42 mm on the penetrometer. This mortar is then applied to the horizontal concrete surface using a trowel having four 4×4 mm notches. A ceramic tile, 5×5 cm is immediately bonded to the mortar using a 1-kg weight for 30 seconds. The tile is then removed from the mortar and the amount of the surface of the tile which is covered with mortar is visually determined as the percentage of the entire area of the tile which was contacted with the mortar. This procedure is repeated at 10, 20 and 30 minutes after the application of the mortar to the cement surface. To be useful as a ceramic tile adhesive, at least 50 percent of the area of the tile which is contacted with the mortar 20 minutes after the application thereof to the concrete surface should be covered with mortar.

EXAMPLE 1

Samples Nos. 1A–1D and Comparative Sample No. C-1 are prepared by thoroughly mixing 200 g of Portland cement, 300 g of sand and 3 g of a water retention aid. In Sample Nos. 1A–1D, the water retention aid comprises 98.3 weight percent of a hydroxypropylmethylcellulose (HPMC) (commercially available as METHOCEL ®K from the Dow Chemical Company) and 1.7 weight percent of a polymer of acrylamide which is 30–35 percent hydrolyzed and crosslinked with 0.2 weight percent methylene bis acrylamide. The molecular weight of the HPMC is varied between the samples and the 2 percent solution viscosity of each HPMC is as reported in Table I following.

In Comparative Sample No. C-1, the water retention aid comprises 98.5 weight percent METHOCEL K and 1.5 weight percent of a linear polyacrylamide. This linear polyacrylamide exhibits a pH of 10.1 as an aqueous solution containing 0.5 weight percent of the linear polyacrylamide at 20° C. The linear polyacrylamide also has a weight average molecular weight of about 4 million.

Each of Sample Nos. 1A–1D and Comparative Sample No. C-1 is blended with sufficient water to prepare a mortar having a consistency of about 35 to 45 mm on the penetrometer. The resulting mortars are evaluated for water loss, sag resistance, open time and bonding strength according to the foregoing procedures with the results as in Table I following.

TABLE I

| Parameter[1] | Sample Nos. | | | | |
|---|---|---|---|---|---|
| | 1A | 1B | 1C | 1D | C-1* |
| Cellulose ether Viscosity[2] | 4,000 | 15,000 | 75,000 | 100,000 | 4,000 |
| Polyacrylamide Type[3] | cross-linked | cross-linked | cross-linked | cross-linked | linear |
| Polyacrylamide Amount[4] | 1.7 | 1.7 | 1.7 | 1.7 | 1.7 |
| Penetrometer (mm) | 43 | 39 | 42 | 40 | 44 |
| Water Loss (g) | 0.12 | 0.07 | 0.12 | 0.07 | 0.14 |
| Sag Resistance (mm) | 0 | 0 | 0 | 0 | 0 |
| Open Time (%) | | | | | |
| 0 min. | 95 | 85 | 95 | 95 | 90 |
| 10 min. | 90 | 85 | 95 | 80 | 80 |
| 20 min. | 75 | 80 | 90 | 20 | 80 |
| 30 min. | 45 | 80 | 80 | 10 | 70 |
| Bonding Strength (Kg/cm[2]) | | | | | |
| 0 min. | | | | | |
| 7 days | 1.44 | 1.03 | 1.41 | 1.69 | 0.65 |
| 14 days | 1.34 | 2.54 | 2.66 | 1.69 | 0.69 |
| 21 days | 1.38 | 2.35 | 1.54 | 1.88 | 0.84 |
| 28 days | 1.47 | 2.22 | 2.41 | 1.66 | 0.87 |
| 10 min. | | | | | |
| 7 days | 1.12 | 1.38 | 1.70 | 1.22 | 0.62 |
| 14 days | 0.94 | 2.00 | 1.74 | 1.34 | 0.59 |
| 21 days | 1.06 | 1.56 | 1.70 | 1.44 | 0.50 |
| 28 days | 1.06 | 1.69 | 1.77 | 1.41 | 0.62 |
| 20 min. | | | | | |
| 7 days | 0.36 | 0.43 | 1.20 | 0.5 | 0.20 |
| 14 days | 0.15 | 0.43 | 1.25 | 0.62 | 0.25 |
| 21 days | 0.31 | 0.31 | 1.31 | 0.68 | 0.31 |
| 28 days | 0.31 | 0.43 | 1.33 | 0.56 | 0.25 |
| 30 min. | | | | | |
| 7 days | 0.12 | 0.31 | 0.50 | 0.12 | 0.06 |
| 14 days | 0.06 | ·0.18 | 0.47 | 0.25 | 0.09 |
| 21 days | 0.06 | 0.31 | 0.50 | 0.31 | 0.06 |
| 28 days | 0.06 | 0.31 | 0.54 | 0.43 | 0.06 |

*Not an example of the invention.
[1]Refers to test methods described before Example 1 herein.
[2]Viscosity at 20° C. of an aqueous solution containing 2 weight percent of the cellulose ether. In each case, the cellulose ether is commercially available as METHOCEL K from the Dow Chemical Company.
[3]Crosslinked polyacrylamides are crosslinked with 0.2 percent methylene bis acrylamide.
[4]The amount of polyacrylamide expressed as a percentage of the water retention aid.

As can be seen from the foregoing table, the water loss and sag resistance of all samples and the comparative sample are essentially equivalent. Additionally, with the exception of Sample No. 1D after and including 20 minutes, all samples tested will adequately adhere to large areas of the ceramic tiles for at least 20 minutes after the spreading of the mortar. Moreover, the examples of this invention exhibit far superior bonding strength than the conventional adhesive composition as represented by Sample No. C-1, especially when ceramic tiles are bonded thereto at 20 minutes or less from the time the mortar is spread.

EXAMPLE 2

Example 2 shows the effect of adding various levels of the crosslinked organic polymer to the tile adhesive composition. Each of Sample Nos. 2A-2D and Comparative Sample No. C-2 is prepared using 200 g of Portland cement, 200 g of sand and 3 g of a water retention aid. The water retention aid in all cases is a hydroxypropylmethylcellulose (sold commercially as METHOCEL®F4M by the Dow Chemical Company) containing various amounts of the crosslinked polyacrylamide employed in Sample Nos. 1A-1D. The amount of the crosslinked polyacrylamide employed in each sample is as noted in Table II following. Each sample is mixed with water such that the resulting mixed mortar has a consistency of 35-42 mm on the penetrometer and the water loss, sag resistance, open time and bonding strength of the resulting mortar is determined. The results are as shown in Table II following.

TABLE II

| Parameter[1] | Sample Nos. | | | | |
|---|---|---|---|---|---|
| | 2A | 2B | 2C | 2D | C-2* |
| Crosslinked Polyacrylamide (%)[2] | 1.0 | 1.3 | 1.7 | 2.0 | 0 |
| Penetrometer (mm) | 40 | 40 | 38 | 38 | 43 |
| Water Loss (g) | 0.19 | 0.08 | 0.10 | 0.15 | 0.09 |
| Sag Resistance (mm) | 0 | 0 | 0 | 0 | 10 |
| Open Time (%) | | | | | |
| 0 min. | 98 | 90 | 80 | 90 | 70 |
| 10 min. | 95 | 90 | 80 | 90 | 70 |
| 20 min. | 95 | 80 | 80 | 60 | 10 |
| 30 min. | 90 | 50 | 30 | 50 | 5 |
| Bonding Strength (Kg/cm[2]) | | | | | |
| 0 min. | | | | | |
| 7 days | 0.53 | 0.50 | 0.56 | 0.65 | 0.65 |
| 14 days | 0.62 | 0.81 | 0.84 | 0.62 | 0.50 |
| 21 days | 0.69 | 1.03 | 0.81 | 0.72 | 0.47 |
| 28 days | 0.65 | 0.94 | 0.81 | 0.75 | 0.47 |
| 10 min. | | | | | |
| 7 days | 0.47 | 0.50 | 0.50 | 0.56 | 0.50 |
| 14 days | 0.50 | 0.65 | 0.62 | 0.62 | 0.47 |
| 21 days | 0.43 | 0.81 | 0.65 | 0.62 | 0.40 |
| 28 days | 0.47 | 0.50 | 0.62 | 0.50 | 0.30 |

*Not an example of the invention.
[1]Refers to test methods described before Example 1 herein.
[2]Amount of crosslinked polyacrylamide expressed as a percentage of the water retention aid. Sample No. C-2 contains no linear or crosslinked polyacrylamide polymers.

The advantages of employing the modified cellulose ether compositions of this invention, (Sample Nos. 2A-2D), as compared with an unmodified cellulose ether of the same type, (Sample No. C-2), are seen in Table II. Sag resistance is improved 100 percent in the samples of this invention as compared with Comparative Sample No. C-2. Similarly, highly improved open time is seen in the samples of this invention. Moreover, a general improvement in bonding strength is seen when a modified cellulose ether composition is employed.

EXAMPLE 3

Sample Nos. 3A-3D and Comparative Sample No. C-3 are prepared using 200 g of Portland cement, 300 g of sand and 3 g of a water retention aid. In these samples, the water retention aid is methylcellulose (methoxyl degree of substitution about 1.6-1.8; 2 percent solution viscosity about 20,000 cps) having various levels of the crosslinked polyacrylamide employed in Example Nos. 1 and 2. The amounts of crosslinked polyacrylamide employed are as noted in Table III following. Each sample is mixed with water until the penetrometer reading of the resulting mortar is between 35-42 mm. The water loss, sag resistance, open time and bonding strength of the mortar is then determined. The results are as shown in Table III following.

TABLE III

| Parameter[1] | Sample Nos. | | | | |
|---|---|---|---|---|---|
| | 3A | 3B | 3C | 3D | C-3* |
| Crosslinked Polyacrylamide[2] | 1.0 | 1.3 | 1.7 | 2.0 | 0 |
| Penetrometer (mm) | 43 | 42 | 43 | 40 | 38 |
| Water Loss (g) | 0.16 | 0.06 | 0.04 | 0.13 | 0.15 |
| Sag Resistance (mm) | 0 | 0 | 0 | 0 | 27 |
| Open Time (%) | | | | | |
| 0 min. | 100 | 100 | 85 | 100 | 95 |
| 10 min. | 99 | 95 | 85 | 95 | 90 |
| 20 min. | 85 | 80 | 80 | 90 | 90 |
| 30 min. | 75 | 80 | 80 | 90 | 20 |
| Bonding Strength (Kg/cm$^2$) | | | | | |
| 0 min. | | | | | |
| 7 days | 0.62 | 0.56 | 0.62 | 0.72 | 0.78 |
| 14 days | 0.65 | 0.87 | 1.06 | 0.69 | 0.65 |
| 21 days | 0.50 | 0.62 | 0.94 | 0.65 | 0.69 |
| 28 days | 0.62 | 0.72 | 0.78 | 0.69 | 0.62 |
| 10 min. | | | | | |
| 7 days | 0.43 | 0.50 | 0.59 | 0.62 | 0.69 |
| 14 days | 0.59 | 0.81 | 0.97 | 0.65 | 0.62 |
| 21 days | 0.40 | 0.56 | 0.72 | 0.50 | 0.47 |
| 28 days | 0.47 | 0.62 | 0.62 | 0.43 | 0.47 |

*Not an example of the invention.
[1]Refers to test methods described before Example 1 herein.
[2]See Note 2, Table II. Sample No. C-3 contains no polyacrylamide of any type.

As can be seen in Table III, the poor sag resistance of Comparative Sample No. C-3 is overcome in the samples of this invention. Note also that the samples of this invention generally exhibit bonding strengths comparable or superior to those attained with Comparative Sample C-3. Additionally, comparable or superior water loss and open time results are obtained, especially with Sample Nos. 3B and 3C.

What is claimed is:

1. A modified carbohydrate polymer composition comprising from about 50 to about 99.95 weight percent of a water-soluble carbohydrate polymer and from about 0.05 to about 50 weight percent of a crosslinked, water-swellable, nonflocculating partially hydrolyzed polyacrylamide wherein the polyacrylamide has a Flocculation Index of at least 0.60.

2. The modified carbohydrate polymer composition of claim 1 wherein the partially hydrolyzed, crosslinked polyacrylamide is capable of retaining at least 50 grams of water per gram of polymer.

3. The modified carbohydrate polymer composition of claim 2 wherein the water-soluble carbohydrate polymer is a cellulose ether, guar or guar derivative, or starch.

4. The modified carbohydrate polymer composition of claim 3 wherein the carbohydrate polymer is hydroxypropylmethylcellulose, methylcellulose, hydroxyethylcellulose or hydroxyethylmethylcellulose.

5. The modified carbohydrate polymer of claim 1 comprising from about 0.3 to about 10 weight percent of the partially hydrolyzed, crosslinked polyacrylamide.

6. The modified carbohydrate polymer composition of claim 1 in a cementitious composition.

7. The modified carbohydrate polymer composition of claim 1 in a ceramic tile adhesive composition, said ceramic tile adhesive composition comprising from about 25 to 99.99 weight percent of Portland cement, 0 to 74.99 weight percent of an inert filler, and 0.01 to 10 weight percent of the modified carbohydrate polymer composition.

8. The modified carbohydrate polymer composition of claim 3 in a ceramic tile adhesive.

9. The modified carbohydrate polymer composition of claim 3 in a gypsum plaster composition.

10. The modified carbohydrate composition of claim 3 in a cement plaster or stucco composition.

11. The modified carbohydrate polymer composition of claim 3 in a wallpaper adhesive.

12. The modified carbohydrate polymer of claim 3 in a concrete composition.

13. The modified carbohydrate composition of claim 1, wherein the polyacrylamide of claim 1 has a Flocculation Index of at least 0.70.

* * * * *